United States Patent

Oriez et al.

[11] Patent Number: 5,129,807
[45] Date of Patent: Jul. 14, 1992

[54] INSTALLATION FOR HIGH FREQUENCY MOLDING OF PLASTIC MATERIAL

[75] Inventors: Robert Oriez, Vendome; Elie Gras, Genay, both of France

[73] Assignee: Anver, Maisons Alfort, France

[21] Appl. No.: 543,112

[22] Filed: Jun. 25, 1990

[30] Foreign Application Priority Data

Jun. 28, 1989 [FR] France .................. 89 08606

[51] Int. Cl.$^5$ .................................. B29C 35/08
[52] U.S. Cl. ..................... 425/174; 264/252; 425/453
[58] Field of Search ........... 425/453, 34.3, DIG. 201, 425/174, 174.4, 174.6, 110, 117; 264/101, 571, 252; 156/104, 285

[56] References Cited

U.S. PATENT DOCUMENTS

| 3,444,275 | 5/1969 | Willett | 264/102 |
| 3,506,755 | 4/1970 | Rudder et al. | 425/DIG. 201 |
| 3,824,062 | 7/1974 | Farrell | 425/451 |
| 4,128,378 | 12/1978 | Otsu et al. | 425/DIG. 201 |
| 4,751,029 | 6/1988 | Swanson | 425/DIG. 201 |
| 4,800,049 | 1/1989 | Gras | 425/174.8 E |
| 4,954,073 | 9/1990 | Oriez et al. | 425/547 |

FOREIGN PATENT DOCUMENTS

| 652964 | 9/1964 | Belgium . |
| 2140364 | 1/1973 | France . |
| 2251421 | 6/1975 | France . |
| 1060908 | 3/1967 | United Kingdom . |

*Primary Examiner*—David A. Simmons
*Assistant Examiner*—W. Jackson Matney, Jr.
*Attorney, Agent, or Firm*—Bell, Seltzer, Park & Gibson

[57] ABSTRACT

An apparatus for high frequency molding plastic material using a mold made of a conventional material for applying this technique, e.g. a silicone elastomer or like material. The mold is kept locked shut while the shaped plastic material is cooling by the effect of a pressure reduction set up inside the mold after the high frequency electric field has been applied.

8 Claims, 1 Drawing Sheet

INSTALLATION FOR HIGH FREQUENCY MOLDING OF PLASTIC MATERIAL

The invention relates to a method and to an installation for high frequency molding of plastic material.

BACKGROUND OF THE INVENTION

French patent specification U.S. Pat. No. 4,800,049, in the name of ANVER describes a method and apparatus for manufacturing molded objects out of plastic material from a liquid plastisol which is injected into a mold, which mold is subjected to the action of a high frequency electric field from a suitable generator. Such a technique is used, for example, for manufacturing articles of leather goods or parts for shoes. In order to extend the method and the apparatus implementing the method to other applications, such as manufacturing overmolded parts e.g. car windows with integrated peripheral seals, ANVER has already proposed (in U.S. Pat. No. 4,954,073, filed May 4, 1988) an improved method and apparatus suitable for use with plastisols or other liquid plastic materials, in particular those of the polyethyl or polyurethane type.

The method and apparatus described in the above-mentioned U.S. Pat. No. 4,954,073 give full satisfaction. However, manufacturing throughput is not as high as could be desired and this is because implementation of the method requires that the two half-shells of the mold should be kept pressed against each other for a certain length of time after the high frequency field has been applied. In an apparatus having a single field generator, this is done by keeping the mold locked shut for several minutes between the plates of a press associated with the generator. The generator is therefore not available during this period of time which is the time during which polymerization takes place, and high throughput can thus be obtained with the apparatus only by an installation of the carousel type or by means enabling the generator to be displaced, both of which solutions are mechanically complex and expensive. The same applies to the installation described in U.S. Pat. No. 3,444,275 where a press is mechanically locked under the control of an actuator.

Consequently, a general object of the invention is to provide a method and an installation for high frequency molding of plastic material enabling high manufacturing throughput rates to be obtained in an installation having a generator associated with a press.

SUMMARY OF THE INVENTION

Taking advantage of the nature of the constituent material of the mold as generally used in methods and installations for high frequency molding of plastic material (a silicone elastomer or analogous material), the problem posed in this way is solved by keeping the mold locked shut while the shaped plastic material is cooling by the effect of a pressure reduction set up inside the mold after the high frequency electric field has been applied.

The simplest way of reducing the pressure inside the mold is to connect a vacuum source to one or more end fittings provided with respective non-return valves, said fitting(s) passing through the wall of the mold and opening out into its inside.

The mold is thus locked simply and reliably and mold locking is maintained while the polymerized plastic material is cooling, thereby enabling such cooling to take place outside the press associated with the high frequency field generator.

In addition, and without requiring any further means, this makes it possible to keep the two half-shells constituting the mold together so that the mold is easily handled, e.g. for being displaced and passed through a cooling tunnel, thereby further reducing operating cycle time.

According to the invention, an installation for implementing the method described above comprises a high frequency electric field generator, a press associated with said generator for clamping the mold shut while said high frequency electric field is applied thereto, at least one station for loading and unloading molds, handling and conveyor means for taking molds from said station to the press and back again, and at least one vacuum source, the installation further including means for connecting said vacuum source to the inside of a mold in which plastic material to be polymerized has been injected in order to ensure that said mold is locked immediately after the high frequency electric field has been applied by the generator and while the mold is still in the press, together with means at said unmolding station for breaking the vacuum inside the mold so as to enable the two half-shells of the mold to be separated and allow a molded part to be extracted therefrom.

Said means for connecting the vacuum source to the inside of a mold may comprise at least one end fitting fitted with a non-return valve and projecting from the wall of the mold, said end fitting penetrating to the inside cavity of the mold by passing through the mold wall, the installation including duct means and coupling means suitable for being interposed between said vacuum source and said end fitting.

In an installation designed for manufacturing car windows having integrated peripheral seals, the vacuum may be applied via two end fittings opening out into the inside cavity of the mold on either side of said window or similar object having molding being performed thereover in order to form said integrated peripheral gasket.

Finally, the installation may further include a cooling tunnel through which the molds travel after leaving the press associated with the high frequency electric field and while they are kept locked under the effect of the pressure reduction set up inside them after said high frequency electric field has been applied.

BRIEF DESCRIPTION OF THE DRAWING

An implementation of the invention is described by way of example with reference to the accompanying drawing, in which.

DETAILED DESCRIPTION

Figure 1:
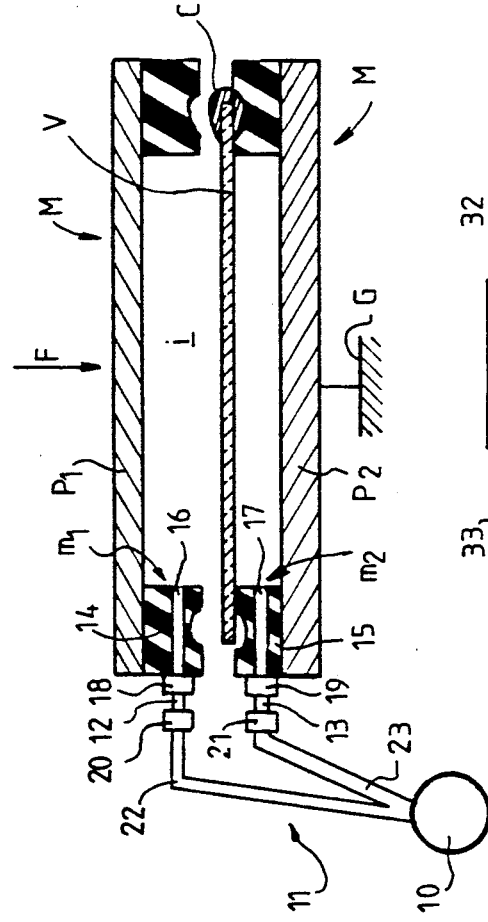
FIG. 1 is a highly diagrammatic section view through a mold suitable for use in a method and an installation of the invention.

For manufacture by high frequency molding of plastic material, and in particular for manufacturing a part V such as a car window having a peripheral seal or strip c of plastic material molded thereover by means of a mold M constituted by a first half-shell m1 and a second half-shell m2 both made of silicone elastomer, the part V is initially put into place, then the mold is closed, plastic material is inserted, and the mold is brought up to a high frequency electrical generator represented highly diagrammatically by ground plane G. The generator is usually fixed or disposed in the vicinity of a press whose plates p1 and p2 are suitable for co-operating with the half-shells m1 and m2 of the mold, which are themselves generally placed on supports (not shown). After the plates p1 and p2 have been moved towards each other in order to pressure lock the mold, as represented by arrow F, the application of a high frequency electrical field causes the plastic material to polymerize, e.g. around the peripheral seal or strip c. The conventional technique is to keep the mold M between the plates of the press throughout the polymerization stage and throughout the cooling stage that follows the application of the high frequency field, thus making the generator unavailable throughout this period of time which may be several minutes.

To mitigate the drawback of the generator being unavailable for as long a the mold is kept in the press after the high frequency field has been applied by the generator associated therewith, the invention provides for locking the mold M after the electric field has been applied by the effect of a pressure reduction set up inside the mold. In the embodiment of the invention described and shown, this is done by associating the prior art device with a vacuum source 10 and with means 11 for connecting said vacuum source to the inside of a mold after the frequency electric field has been applied. More precisely, the said means 11 comprise two end fittings 12 and 13 projecting from the walls 14 and 15 of respective ones of the two half-shells m1 and m2, which end fittings pass through respective ones of the walls via channels 16 and 17 and open out to the inside i of the mold on either side of the part V.

each end fitting 12, 13 is provided with a respective non-return valve 18, 19 such that when the end fittings 12 and 13 are engaged via couplings 20 and 21 to ducts 22 and 23 connected to the vacuum source 10, a vacuum is established inside the mold cavity on either side of the part V.

The vacuum is maintained reliably inside the mold cavity because of the very nature of the constituent material of the mold, which is generally a silicone elastomer or the like, thus ensuring that the two half-molds m1 and m2 are pressed against each other in airtight manner without there being any need to take special precautions.

The method of the invention and the means for implementing it as described above thus make it possible, immediately after the high frequency electric field has been applied to cause the plastic material in the mold to polymerize, to hold the two half-shells m1 and m2 of the mold locked together, thereby enabling the unit assembly constituted in this way to be extracted from the press, and thus releasing access to the press and to the generator for applying the polymerizing electric field to another mold, with the manufacturing time cycle consequently being greatly reduced.

Figure 2:
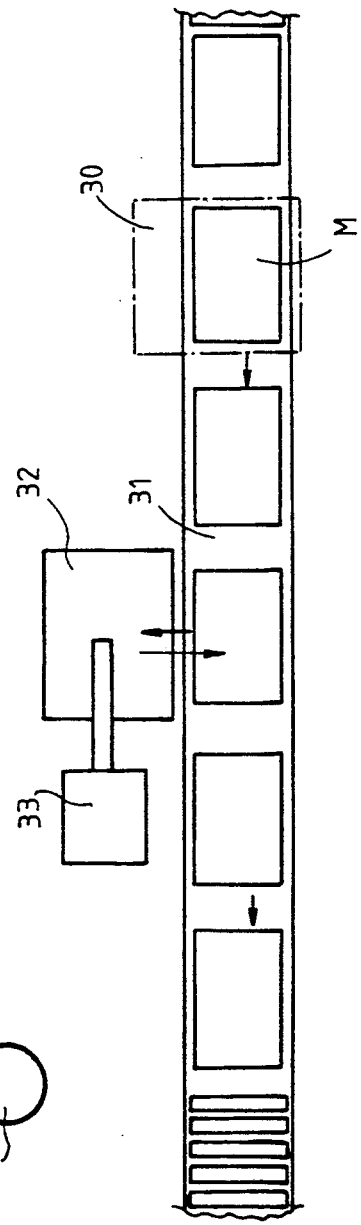
FIG. 2 is a block diagram of an installation of the invention.
Figure 3:
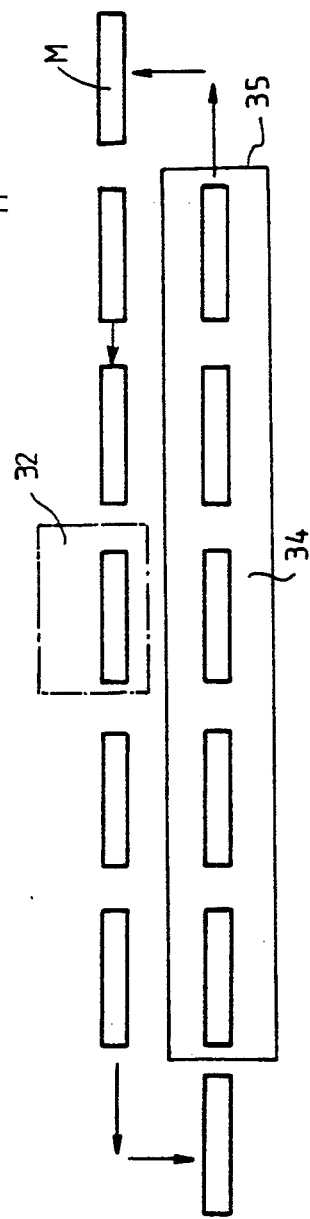
FIG. 3 is a block diagram showing the structure of an installation of the invention.

Manufacture can thus be performed using an installation as shown in FIGS. 2 and 3, i.e. having a first work station 30 for loading an unloading the mold M, conveyor means 31 for conveying the mold to a press 32, where a vacuum is established inside the mold cavity after a field has been applied by a high frequency generator 33, such that after the press has been opened, the said mold can be extracted and transferred by the conveyor means 31 through a cooling tunnel 34 with the mold M returning to the station 30 at the outlet 35 from the cooling tunnel where it is unloaded and where unmolding is performed after the vacuum has been broken.

We claim:

1. An installation for high frequency molding of plastic material comprising:
   a plurality of molds, each mold comprising walls and an internal cavity;
   a press for clamping one of said molds shut and holding it shut;
   a high frequency electric field generator cooperating with said one mold while it is held by said press and operable for heating the mold;
   a vacuum source for crating a vacuum inside said one mold effective for maintaining the mold in a shut condition;
   means for releasably connecting said vacuum source to the internal cavity of said one mold after the operation of said generator and while the mold is still held by said press so that the mold can be released from said press and said vacuum source while remaining held shut by vacuum during cooling to make the press, generator, and vacuum source available for use with another of said molds;
   handling and conveyor means cooperating with said press for removing said mold shut by vacuum and placing another of said plurality of molds in said press; and
   means for releasing the vacuum in the mold after cooling of the mold to permit opening of the mold and extraction of a molded plastic part.

2. An installation according to claim 1 for manufacturing car windows having an integrated peripheral seal, wherein said means for releasably connecting said vacuum source to the internal cavity of said one mold further comprises:
   end fittings for the application of vacuum, said end fittings opening out into said mold, one on each side of said window on which molding of said seal is being performed; and
   a non-return valve mounted on each of said end fittings for maintaining the vacuum in the mold following the release of the mold from said press and said vacuum source so as to maintain the vacuum in the mold during cooling of the mold.

3. An installation according to claim 1 wherein said handling and conveyor means further comprises a cooling tunnel through which the molds, while being held shut by vacuum, travel after release from the press.

4. An installation for high frequency molding of plastic material comprising:
   a plurality of molds, each mold comprising walls and an internal cavity;
   a press for clamping one of said molds shut and holding it shut;
   a high frequency electric field generator cooperating with said one mold while it is held by said press and operable for heating the mold;
   a vacuum source for creating a vacuum inside said one mold effective for maintaining the mold in a shut condition;
   end fittings for the application of vacuum, said end fittings opening out into said mold;
   a non-return valve mounted on each of said end fittings for maintaining the vacuum in the mold following the release of the mold from said press and said vacuum source so as to maintain the vacuum in the mold during cooling of the mold;

a station for loading and unloading said molds;

handling and conveyor means cooperating with said press and said station for removing said mold shut by vacuum from the press, taking the mold from said press to said station, and placing another of said plurality of molds in said press; and means for releasing the vacuum in the mold after cooling of the mold to permit opening of the mold and extraction of a molded plastic part.

5. An installation according to claim 4 wherein said end fittings open out into said mold by passing through a mold wall, and the installation further comprises ducts and a coupling fitted on each said duct for removable coupling of one of said ducts to each said end fitting.

6. An installation for high frequency molding of plastic material comprising:

a mold comprising walls and a first internal cavity for the overmolding of a seal over a support and a second internal cavity for accommodating the part of the support over which no seal is overmolded;

a press for clamping one of said molds shut and holding it shut;

a high frequency electric field generator cooperating with said mold while it is held by said press and operable for heating the mold;

a vacuum source for creating a vacuum inside said mold effective for maintaining the mold in a shut condition;

at least one end fitting for the application of vacuum, said end fitting opening out into said second internal cavity; and a non-return valve mounted on said end fitting for maintaining the vacuum in the mold following the release of the mold from said press and said vacuum source so as to maintain the vacuum in the mold during cooling of the mold;

a duct connected to the vacuum source;

a coupling fitted on the duct for removable coupling of said duct to said end fitting so that the mold can be released from said vacuum source; and means for releasing the vacuum in the mold after cooling of the mold to permit opening of the mold and extraction of a molded plastic part.

7. An installation according to claim 6, wherein said installation further comprises:

a plurality of said molds;

a station for loading and unloading said molds; and handling and conveyor means cooperating with said press and said station for removing said mold shut by vacuum from the press, taking the mold from said press to said station, and placing another of said plurality of molds in said press.

8. An installation according to any of claims 1, 4, or 6 wherein said mold comprises a silicone elastomer.

* * * * *